US012669616B2

(12) United States Patent
Fritz et al.

(10) Patent No.: US 12,669,616 B2
(45) Date of Patent: Jun. 30, 2026

(54) METHOD FOR OPTIMIZING THE ENVIRONMENT SENSING FOR A DRIVING ASSISTANCE SYSTEM BY MEANS OF AN ADDITIONAL REFERENCE SENSOR SYSTEM

(71) Applicant: Robert Bosch Gmbh, Stuttgart (DE)

(72) Inventors: Christian Fritz, Karlsruhe (DE); Holger Wunsch, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 18/727,362

(22) PCT Filed: Jan. 3, 2023

(86) PCT No.: PCT/EP2023/050053
§ 371 (c)(1),
(2) Date: Jul. 30, 2024

(87) PCT Pub. No.: WO2023/131603
PCT Pub. Date: Jul. 13, 2023

(65) Prior Publication Data
US 2025/0085431 A1      Mar. 13, 2025

(30) Foreign Application Priority Data
Jan. 10, 2022      (DE) ..................... 10 2022 200 139.7

(51) Int. Cl.
*G01S 17/00*      (2020.01)
*G01S 17/931*      (2020.01)

(52) U.S. Cl.
CPC .................................. *G01S 17/931* (2020.01)

(58) Field of Classification Search
None
See application file for complete search history.

(56) References Cited

U.S. PATENT DOCUMENTS 9,823,081 B2 * 11/2017 Crawford ............... G01C 21/34
12,322,187 B1 * 6/2025 Boydston .............. G01S 13/931
(Continued)

FOREIGN PATENT DOCUMENTS

DE            102018123735 A1        3/2020
WO       WO-2021081459 A1 *     4/2021    ............. G06V 10/25

OTHER PUBLICATIONS

Schaermann, et al.: "Validation of Vehicle Environment Sensor Models," 2017 IEEE Intelligent Vehicles Symposium (IV), (2017), Redondo Beach, CA, USA, pp. 405-411, XP033133785.
(Continued)

*Primary Examiner* — James M McPherson
(74) *Attorney, Agent, or Firm* — NORTON ROSE FULBRIGHT US LLP

(57) ABSTRACT
A method for optimizing the environment sensing for a driving assistance system having sensor data fusion using an additional reference sensor system. The method includes: using a sensor for environment sensing as a reference sensor; creating a first environment model on the basis of sensor data from the reference sensor; creating a second environment model on the basis of sensor data from the sensor data fusion; and comparing the first environment model with the second environment model.

13 Claims, 2 Drawing Sheets

(56) References Cited

U.S. PATENT DOCUMENTS

| | | | | |
|---|---|---|---|---|
| 12,422,532 | B1 * | 9/2025 | Bhaskaran | G01S 7/497 |
| 2017/0369051 | A1 * | 12/2017 | Sakai | G06V 10/255 |
| 2022/0176988 | A1 * | 6/2022 | Wang | G06V 20/56 |
| 2022/0366175 | A1 * | 11/2022 | Yu | G05D 1/2435 |

OTHER PUBLICATIONS

Zhou, et al.: "Automated Evaluation of Semantic Segmentation Robustness for Autonomous Driving," arXiv:1810.10193v1; Cornell University Library, (2018), pp. 1-12; XP080927273.
International Search Report issued in PCT/EP2023/050053 issued on Apr. 11, 2023.

* cited by examiner

1

METHOD FOR OPTIMIZING THE ENVIRONMENT SENSING FOR A DRIVING ASSISTANCE SYSTEM BY MEANS OF AN ADDITIONAL REFERENCE SENSOR SYSTEM

FIELD

The present invention relates to a method for optimizing the environment sensing for a driving assistance system having sensor data fusion using an additional reference sensor system. The present invention also relates to a control device configured to perform such a method. Furthermore, the present invention relates to a computer program which comprises commands which, when the computer program is executed by a computer or a control device, cause the computer or control device to perform the method, and also to a machine-readable storage medium on which this computer program is stored.

BACKGROUND INFORMATION

The software architecture of modern multi-sensor driver assistance systems, in particular of SAE levels 1 and 2, typically consists of a plurality of layers that build on one another. These layers usually comprise the sensor system, the environment sensing, the situation analysis, the function and the control.

The technical correctness of the software is tested modularly, as is usual in software engineering. "Technical correctness" refers to the correct functioning of the software, i.e., the behavior of the algorithms according to specification, no program crashes, etc.

The key requirement for safeguarding and optimizing performance, i.e., the real-life behavior of the software in specific traffic situations, is the availability of a meaningful amount of trip data. These trip data are ascertained by means of endurance test drives of a minimum length of several thousand kilometers, and the behavior of the vehicle in these measurement campaigns is subsequently analyzed. The thus annotated data form the basis for subsequent optimization runs. Safeguarding and optimizing performance largely take place only at the overall system level. The performance of the individual layers in isolation is usually not considered.

German Patent Application No. DE 10 2018 123 735 A1 describes a method for improving an evaluation of an object recognition of a radar device of a motor vehicle, wherein the method comprises the following steps:

generating a first environment map of an environment by means of a LiDAR scanner, carrying out a first object recognition on the basis of the generated first environment map by means of a first recognition device, creating a ground truth environment model on the basis of the carried-out first object recognition by means of the first recognition device, generating a second environment map of the environment by means of the radar device, repeatedly carrying out a second object recognition with alternative object recognition algorithms on the basis of the generated second environment map by means of a second recognition device of the radar device, creating a radar environment model in each case on the basis of the repeatedly carried-out second object recognition by means of the second recognition device, repeatedly determining object recognition algorithm-specific quality functions of the radar device on the basis of a deviation of the radar environment models from the ground truth environment model by means of a determination device, and identifying a suitable object recognition algorithm on the basis of a level of the quality function by means of the determination device.

SUMMARY

The present invention provides a method for optimizing the environment sensing for a driving assistance system having sensor data fusion, in particular using an additional reference sensor system. According to an example embodiment of the present invention, the method comprises the following method steps:

a) using a sensor for environment sensing as a reference sensor;

b) creating a first environment model on the basis of sensor data from the reference sensor;

c) creating a second environment model on the basis of sensor data from the sensor data fusion; and d) comparing the first environment model with the second environment model.

By means of such a method according to the present invention, a method for environment sensing for a driving assistance system and thus environment sensing-based processes of the driving assistance system can be improved in comparison to solutions from the related art, in particular by using an additional reference sensor system.

In particular, the method described here is based on achieving an improvement in the environment sensing in a fusion system through comprehensive optimization of the performance. Within the meaning of the present invention, a fusion system or a sensor data fusion is in particular to mean that sensor data from different sensors, in particular from different sensor groups, are combined with one another in order to generate a common environment model. Furthermore, the term "different sensor groups" should be understood to mean sensors of different designs or sensors based on a different operating principle.

It should be mentioned that a multi-sensor driving assistance system, i.e., a driving assistance system having sensor data fusion of SAE levels 1 and 2, usually has the following layers or levels, namely, the sensor system, the environment sensing, the situation analysis, the function and the control. These layers expediently build on one another.

On this basis, the described method according to the present invention may in particular be advantageous since the procedure of checking the performance only at the system level shows potential for improvement. Since the performance of a deeper layer is not checked in isolation, there is the risk that specific improvement potential for this deeper layer will not be recognized. The performance of the overall system thus remains at a local maximum, instead of achieving a global maximum by systematically optimizing the performance of the deeper layers as well, as is possible according to the present invention.

The above-described related art takes this problem into account in its approach by evaluating and optimizing the performance of only the radar sensor in isolation at the sensor level.

However, sensor sets in current driver assistance systems are not limited to a single sensor, such as just a radar sensor, but fuse the data from at least one video camera and one or more radars in order to calculate a comprehensive environment model.

Fusion systems are significantly more complex than systems that are limited to a single sensor: Each of the involved sensors has specific systematic strengths and weaknesses, and a performance, which must be evaluated and optimized individually. They are combined in a non-trivial way in the fusion.

The method according to the present invention in particular takes into account that the performance at the environment sensing level in fusion systems is influenced by a plurality of overlapping factors, namely:

1. The individual performance of the individual sensors in isolation;
2. The performance of the algorithms and strategies that implement the fusion; and
3. The effects of the strengths and weaknesses of the involved sensors on the fusion result, in a specific traffic situation and in the context of a specific fusion algorithm.

These questions, which arise from the fusion of multi-modal sensor data, can be effectively covered by the method described here, which is not possible, for example, by a purely radar-based approach, as is conventional in the related art.

In order to achieve the above, according to an example embodiment of the present invention, the method comprises the following method steps.

According to method step a), a sensor is used for environment sensing as a reference sensor. In this method step, a sensor is thus used in a conventional manner to carry out environment sensing. The sensor is to be used as a reference sensor.

Accordingly, according to method step b), an environment model, i.e., in particular a ground truth environment model, is created on the basis of sensor data from the reference sensor. This step is basically conventional in the related art and serves to detect the environment of a vehicle equipped with the driving assistance system and to examine it for possible objects. Accordingly, environment sensing can be a basis for further steps or processes of the driving assistance system.

Furthermore, according to method step c), a second environment model is created on the basis of sensor data from the sensor data fusion. In this step, an environment model is thus created on the basis of different sensors or sensor groups, wherein the sensors or sensor groups for creating the second environment model expediently differ from the sensor or the sensor group for creating the first sensor model.

After the first environment model and the second environment model have been created, they are compared with one another according to method step d). The term "second environment model" is to be understood broadly and can, for example, include the entire model as well as parts thereof, such as data from individual sensor data included in the environment model. This allows significant advantages to be achieved in comparison to the related art. However, it is preferred that data from the sensor data fusion are included in method step d) in at least one step.

The focus of the method described here is thus on the sub-area of environment sensing by means of various sensors or sensor groups and in particular the sensor data fusion. According to the present invention, an improvement in the performance of the sub-area of environment sensing can be achieved. By means of the present invention, achieving local maxima can be prevented and it is made possible to achieve both significantly better performance of the sub-area of environment sensing and improved overall system performance.

It is thus an advantage of the present invention to consider not only an isolated consideration of a sensor or a sensor group of identical sensors but rather a plurality of sensors or sensor groups on the basis of the fusion data. By means of the method described here, it is now made possible to evaluate and optimize the output of the fusion component as a whole and/or of individual parts thereof.

In this respect, as described above, a first environment model can be used as a reference and, in the fusion model, the sensor data from individual sensors or from sensor groups, i.e., sensors of the same design or based on the same operating principle, can in each case be considered and analyzed in a comparison. Individual parts of the sensor data fusion can then be related to one another and/or parts of the sensor data fusion and/or the sensor data fusion as a whole can be related to the first environment model and compared with one another. This can effectively and reliably allow for an evaluation of individual sensor data and improve the result of creating an environment model.

According to an example embodiment of the present invention, preferably, the method may comprise the further method step of:

e) evaluating the sensor data from the sensor data fusion for accuracy. In this embodiment, the environment model, which is created from the sensor fusion and thus from the totality of the sensor data, can thus be assessed. This makes it possible to evaluate the interaction of the sensors and to check the data that are directly included in other processes of a driving assistance system and, if necessary, to correct the data.

It may be particularly preferred that the method comprises the further method step of:

f) evaluating sensor data from individual sensors or sensor groups as part of the sensor data fusion for accuracy.

This makes it possible to assess not only the data provided by the sensor fusion as a whole but also the data from individual sensors or sensor groups. This allows a more accurate evaluation of the sensor data included in the sensor fusion, which can improve the analysis of the data for accuracy. In addition, if necessary, corrections can be made only to data that contain a comparatively large error. This can improve the environment model of the sensor data fusion as a whole.

According to an example embodiment of the present invention, further preferably, the method may comprise the further method step of:

g) evaluating the influence of sensor data from individual sensors or sensor groups as part of the sensor data fusion on proportion of the sensor data fusion.

In this example embodiment of the present invention, it can thus be ascertained how strongly the fusion data are influenced by the relevant sensor or the relevant sensor group and how strongly the fusion data are influenced, in particular relative to other sensors or sensor groups. Thus, the characteristic influence of an individual sensor or a sensor group on the entire fusion component can thus be determined and optimized in the same way as in method step f) and in particular in combination therewith.

According to an example embodiment of the present invention, at least one of the method steps d) to g) can comprise the comparison of individual recognized objects in the environment models. In addition to evaluating an entire environment model, considering individual recognized objects can provide particularly precise results.

Particularly preferably, according to an example embodiment of the present invention, at least one of the method steps d) to g) can be carried out with respect to a specific driving situation. In other words, the driving situation can be recognized by means of an appropriate sensor system. This means that it is, for example, recognized whether a vehicle is in a parking process, driving relatively fast, driving relatively slowly, etc. In doing so, this embodiment takes into account that environment recognition may deliver results of varying accuracy depending on the driving situation and that the sensor data, in particular from different sensors or sensor types, may differ depending on the driving situation. This embodiment thus also makes a particularly high-quality result possible, and driving assistance processes can be performed particularly safely.

Preferably, according to an example embodiment of the present invention, data ascertained in at least one of the method steps d) to g) can be used to improve the environment recognition and can be stored, for example, in a memory. In particular in this embodiment, it becomes clear that the ascertained data may be used to improve the environment recognition. For example, this example embodiment can be based on an artificial intelligence algorithm in order to make a particularly high quality of the result possible and thereby to design driving assistance steps to be particularly reliable and precise and thus safe.

According to an example embodiment of the present invention, it may also be advantageous to use a lidar sensor as a reference sensor in method step a). In particular, the use of a sensor based on lidar (light imaging, detection and ranging) technology can offer advantages within the scope of the method described here. In contrast to many other reference sensor technology approaches, such as hunter-target test drives, the lidar sensor offers the advantage of providing an almost complete environment model with comparatively high accuracy. On the basis of a comprehensive and precise environment model, the optimization of the environment detection can understandably also be particularly accurate or reliable so that the result of the method described here is of particularly high quality.

With regard to further advantages and technical features of the method of the present invention, reference is made to the description of the control system, to the computer program, to the machine-readable storage medium, to the figures and to the description of the figures, and vice versa.

Also described is a control device according to the present invention, wherein the control device is configured to perform a method of the present invention as described above. The control device can be, for example, an on-board control device, an off-board control device, or an off-board server unit such as a cloud system. The control device expediently comprises a processor, into which a computer program can be loaded, which comprises commands for performing the described method.

Accordingly, a computer program is also described, which comprises commands which, when the computer program is executed by a computer or a control device, cause the computer or control device to perform a method of the present invention as described in detail above. The computer program can thus be loaded into the processor in order to execute the commands for carrying out the method of the present invention.

Furthermore, a machine-readable storage medium is thus described, on which the computer program is stored as described above.

The control device, the computer program and the storage medium thus serve to improve environment recognition for a driving assistance system for a vehicle.

With regard to further advantages and technical features of the machine-readable storage medium, of the control system and of the computer program, reference is made to the description of the method of the present invention, to the figures and to the description of the figures, and vice versa.

Further advantages and advantageous embodiments of the objects according to the present invention are illustrated by the figures and explained in the following description, wherein the described features can be an object of the present invention individually or in any combination, unless the context clearly indicates the opposite. It is to be noted that the figures are only descriptive in character and are not intended to limit the present invention in any way.

DETAILED DESCRIPTION OF EXAMPLE EMBODIMENTS

Figure 1:
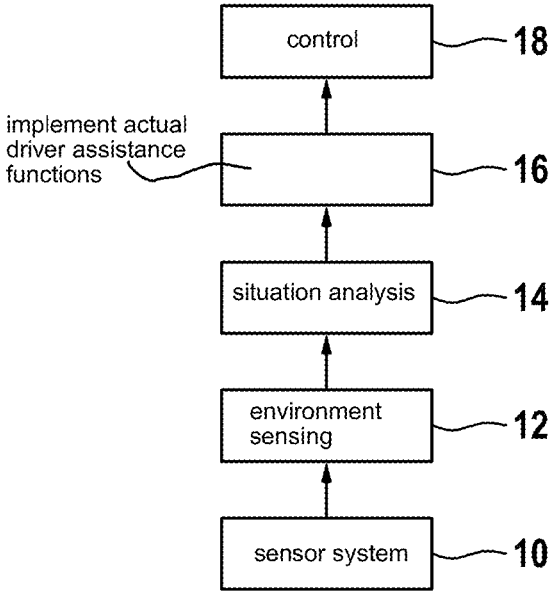
FIG. 1 is a schematic representation of various functional layers of a driving assistance system.

FIG. 1 shows a typical software architecture of modern multi-sensor driver assistance systems of SAE levels 1 and 2. This architecture typically comprises a plurality of layers or levels that build on one another.

The levels perform the following tasks, wherein the next higher level in each case depends on the output of the previous level:

The sensor system 10 communicates directly with the particular sensor hardware, such as radar, camera, lidar, and receives the sensor-specific input data.

The environment sensing 12 describes the task of creating an environment model on the basis of input data from a plurality of sensors, potentially of different modalities. This environment model provides the basis for being able to perform certain functions (see below) at the overall system level. Such an environment model, inter alia, includes static and dynamic objects, such as road users, traffic signs and road markings.

The situation analysis 14 derives an understanding of the ego vehicle's specific current traffic situation from the current environment model and a temporal history.

The function 16 implements the actual driver assistance functions that can actually be experienced in the vehicle, such as an automatic emergency brake or adaptive cruise control.

The control 18 converts the control commands of the functional layer into drive commands in the actuator system.

Figure 2:
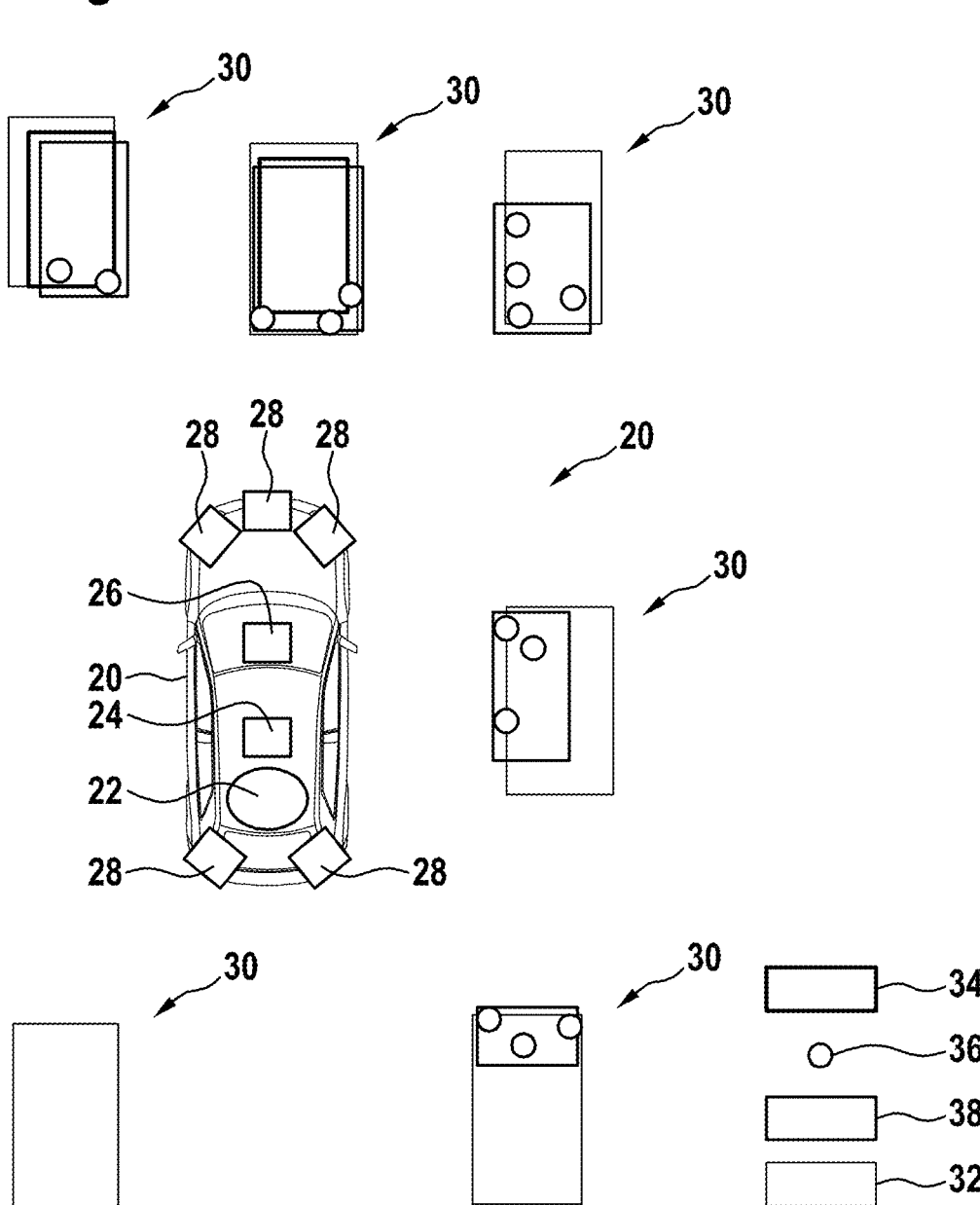
FIG. 2 is a schematic representation of an example embodiment of the method according to the present invention.

FIG. 2 shows a vehicle 20, which comprises a control unit 22, which can be part of a driving assistance system and with which a method for environment sensing for a driving assistance system having sensor data fusion can be implemented. According to the BASt standard, the vehicle 20 can be operated in an assisted, partially automated, highly automated and/or fully automated, or driverless, manner. Furthermore, the vehicle or the control unit can have the software architecture shown in FIG. 1.

The vehicle 20 may, for example, be a passenger car, a truck, a robotaxi, and the like. In principle, the vehicle 20 is not limited to being operated on roads. Rather, the vehicle 20 may also be designed as a watercraft, an aircraft, such as a transport drone, and the like.

The vehicle 20 comprises a plurality of sensors, which capture sensor data and which thus form a sensor fusion and provide data to a sensor data fusion. In detail, a lidar sensor 24, a video camera 26, and a plurality of radar sensors 28 are shown.

By ascertaining corresponding sensor data, the sensors can be used to carry out environment recognition, through which objects 30 in the environment of the vehicle 20 can be recognized and the environment can thus be represented. The sensor data may differ from one another, for example due to their function. Thus, FIG. 2 shows the virtual objects 32 based on sensor data from the lidar sensor 24, the virtual objects 34 based on sensor data from the video camera 26, the virtual objects 36 based on sensor data from the radar sensors 28, and the virtual objects 38 based on a sensor data fusion, i.e., based on all sensor data from the video camera 26 and the radar sensors 28.

Such a setup can perform a method with the following method steps:

a) using a sensor for environment sensing as a reference sensor;

b) creating a first environment model on the basis of sensor data from the reference sensor;

c) creating a second environment model on the basis of sensor data from the sensor data fusion; and d) comparing the first environment model with the second environment model.

The lidar sensor 24 as part of a larger sensor set is not used for the actual signal processing for automated driving functions or driver assistance functions. Instead, it serves as a data supplier for an environment model (ground truth), which is recorded in all endurance runs in addition to the primary sensor data. This environment model is compared to the output of the actual signal processing, in particular the sensor data fusion.

This makes the evaluation and optimization of the output of the fusion component possible, for example by comparing virtual objects 38 from the environment model of the fusion component to virtual objects 32 from the lidar-generated environment model (ground truth).

In this way, a comprehensive data base for ground truth can be ascertained in endurance runs without additional effort, which data base, as described above, is the central basis for a performance assessment of the signal processing.

By individually considering the individual sensors, their relative contribution to the environment model of the fusion component can be assessed and optimized.

As shown in FIG. 2, the ground truth can be compared with both the output of the fusion component and the output of the individual sensors. In this way, it is possible to assess the performance of the sensors individually and of the fusion component individually. On the other hand, the data from the sensors and from the fusion component can be related to one another in order thus to analyze and cluster the specific strengths and weaknesses of the sensors and of the fusion component in specific traffic situations.

The invention claimed is:

1. A method for environment sensing for a driving assistance system having sensor data fusion, the method comprising the following steps:

a) during a drive of a vehicle in an environment, using a single sensor of the vehicle for environment sensing as a reference sensor, and receiving sensor data output solely from the reference sensor;

b) creating a first environment model based on the sensor data output solely from the reference sensor, the first environment model comprising recognized static and dynamic objects in the environment;

c) during the drive and simultaneously with the receiving of the sensor data in step a), receiving sensor data from a plurality of different types of sensors of the vehicle excluding the reference sensor, the plurality of different types of sensors including at least a video camera and at least one radar sensor, and fusing the sensor data from the plurality of different types of sensors to generate fused multi-sensor data;

d) creating a second environment model based on the fused multi-sensor data, the second environment model comprising recognized static and dynamic objects;

e) comparing the objects of the first environment model with the objects of the second environment model, including comparing object existence, object position, and object classification for corresponding objects, wherein, based on a result of the comparison, the driving assistance system is updated by:

(i) data included in the sensor data fusion being corrected;

(ii) a performance of at least one functional layer of the driving assistance system being optimized, the at least one functional layer being: a sensor-system layer, an environment-sensing layer, a situation-analysis layer, a function layer, and/or a control layer; and/or (iii) an influence of sensor data from one of the plurality of different types of sensors on the fused multi-sensor data being optimized; and f) performing a vehicle drive control by the driving assistance system using the driving assistance system as updated.

2. The method according to claim 1, wherein the method further comprises the following step:

evaluating the sensor data from the sensor data fusion for accuracy.

3. The method according to claim 1, further comprising the following step:

evaluating sensor data from individual sensors or sensor groups as part of the sensor data fusion for accuracy.

4. The method according to claim 1, further comprising the following step:

evaluating an influence of sensor data from individual sensors or sensor groups as part of the sensor data fusion on their proportion of the sensor data fusion.

5. The method according to claim 2, further comprising:

evaluating sensor data from individual sensors or sensor groups as part of the sensor data fusion for accuracy; and evaluating an influence of sensor data from individual sensors or sensor groups as part of the sensor data fusion on their proportion of the sensor data fusion;

wherein at least one of the evaluations is carried out with respect to a specific driving situation.

6. The method according to claim 2, wherein the update improves environment recognition.

7. The method according to claim 1, wherein the reference sensor is a lidar sensor.

8. The method according to claim 1, wherein the update includes the optimization of the influence of the sensor data from one of the plurality of different types of sensors on the fused multi-sensor data.

9. The method according to claim 8, wherein the optimization of the influence of sensor data from the one of the plurality of different types of sensors on the fused multi-sensor data includes adjusting a contribution of sensor data from the one sensor to the fused multi-sensor data, thereby modifying the influence or compensating for an error.

10. The method according to claim 1, wherein the update includes the correction of the data included in the sensor data fusion.

11. The method according to claim 1, wherein the update includes the optimization of the performance of the at least one functional layer of the driving assistance system, the at least one functional layer being: the sensor-system layer, the environment-sensing layer, the situation-analysis layer, the function layer, and/or the control layer.

12. A control system configured for environment sensing for a driving assistance system having sensor data fusion, the control device comprising at least one computer configured with executable instructions to:

a) during a drive of a vehicle in an environment, use a single sensor of the vehicle for environment sensing as a reference sensor, and receiving sensor data output solely from the reference sensor;

b) create a first environment model based on the sensor data output solely from the reference sensor, the first environment model comprising recognized static and dynamic objects in the environment;

c) during the drive and simultaneously with the reception of the sensor data in step a), receive sensor data from a plurality of different types of sensors of the vehicle excluding the reference sensor, the plurality of different types of sensors including at least a video camera and at least one radar sensor, and fusing the sensor data from the plurality of different types of sensors to generate fused multi-sensor data;

d) create a second environment model based on the fused multi-sensor data, the second environment model comprising recognized static and dynamic objects;

e) compare the objects of the first environment model with the objects of the second environment model, including comparing object existence, object position, and object classification for corresponding objects, wherein, based on a result of the comparison, the driving assistance system is updated by:

(i) data included in the sensor data fusion being corrected;

(ii) a performance of at least one functional layer of the driving assistance system being optimized, the at least one functional layer being: a sensor-system layer, an environment-sensing layer, a situation-analysis layer, a function layer, and/or a control layer; and/or (iii) an influence of sensor data from one of the plurality of different types of sensors on the fused multi-sensor data being optimized; and f) perform a vehicle drive control by the driving assistance system using the driving assistance system as updated.

13. At least one non-transitory machine-readable storage medium on which is stored a computer program for environment sensing for a driving assistance system having sensor data fusion, the computer program, when executed by at least one computer or control device, causing the computer or control device to perform the following steps:

a) during a drive of a vehicle in an environment, using a single sensor of the vehicle for environment sensing as a reference sensor, and receiving sensor data output solely from the reference sensor;

b) creating a first environment model based on the sensor data output solely from the reference sensor, the first environment model comprising recognized static and dynamic objects in the environment;

c) during the drive and simultaneously with the receiving of the sensor data in step a), receiving sensor data from a plurality of different types of sensors of the vehicle excluding the reference sensor, the plurality of different types of sensors including at least a video camera and at least one radar sensor, and fusing the sensor data from the plurality of different types of sensors to generate fused multi-sensor data;

d) creating a second environment model based on the fused multi-sensor data, the second environment model comprising recognized static and dynamic objects;

e) comparing the objects of the first environment model with the objects of the second environment model, including comparing object existence, object position, and object classification for corresponding objects, wherein, based on a result of the comparison, the driving assistance system is updated by:

(i) data included in the sensor data fusion being corrected;

(ii) a performance of at least one functional layer of the driving assistance system being optimized, the at least one functional layer being: a sensor-system layer, an environment-sensing layer, a situation-analysis layer, a function layer, and/or a control layer; and/or (iii) an influence of sensor data from one of the plurality of different types of sensors on the fused multi-sensor data being optimized; and f) performing a vehicle drive control by the driving assistance system using the driving assistance system as updated.

\* \* \* \* \*